United States Patent
Stull et al.

(10) Patent No.: US 7,299,952 B2
(45) Date of Patent: Nov. 27, 2007

(54) CONTAINER CLOSURE AND METHOD OF ASSEMBLY

(75) Inventors: Jameson P. Stull, Far Hills, NJ (US); Robert T. Auer, East Stroudsburg, PA (US)

(73) Assignee: Stull Technologies, Inc., Somerset, NJ (US)

( * ) Notice: Subject to any disclaimer, the term of this patent is extended or adjusted under 35 U.S.C. 154(b) by 288 days.

(21) Appl. No.: 11/175,587

(22) Filed: Jul. 6, 2005

(65) Prior Publication Data

US 2006/0006203 A1  Jan. 12, 2006

Related U.S. Application Data

(63) Continuation-in-part of application No. 10/888,162, filed on Jul. 8, 2004, now Pat. No. 7,152,763.

(51) Int. Cl.
*B65D 35/00* (2006.01)

(52) U.S. Cl. ............... 222/212; 222/490; 222/494; 222/546

(58) Field of Classification Search ............. 222/212, 222/490, 491, 494, 546
See application file for complete search history.

(56) References Cited

U.S. PATENT DOCUMENTS

| | | |
|---|---|---|
| 1,989,714 A | 2/1935 | Statham |
| 2,758,755 A | 8/1956 | Schafler |
| 4,728,006 A | 3/1988 | Drobish et al. |
| 4,749,108 A | 6/1988 | Dornsbusch et al. |
| 5,033,655 A | 7/1991 | Brown |
| 5,071,017 A | 12/1991 | Stull |
| 5,213,236 A | 5/1993 | Brown et al. |
| 5,271,531 A | 12/1993 | Rohr et al. |
| 5,339,995 A | 8/1994 | Brown et al. |
| 5,409,144 A | 4/1995 | Brown |
| 5,439,124 A | 8/1995 | Mock |
| 5,439,143 A | 8/1995 | Brown et al. |
| 5,632,420 A | 5/1997 | Lohrman et al. |
| 5,676,289 A | 10/1997 | Gross et al. |
| 5,743,443 A | 4/1998 | Hins |
| 5,839,614 A | 11/1998 | Brown |
| 5,897,833 A | 4/1999 | Hunt et al. |
| 5,924,605 A | 7/1999 | Baudin et al. |
| 5,927,549 A | 7/1999 | Wood |

(Continued)

FOREIGN PATENT DOCUMENTS

WO  WO 02/098756  12/2002

OTHER PUBLICATIONS

Seaquist Closures, "Features of Bi-injected Closures," date unknown, 3 pages www.seaquistclosures.com.

*Primary Examiner*—Joseph A. Kaufman
(74) *Attorney, Agent, or Firm*—Drinker Biddle & Reath LLP

(57) ABSTRACT

A container closure includes a base with a valve mount portion formed from a first thermoplastic material and a valve formed from a second thermoplastic material. The valve is bonded to the valve mount portion. A lid is hingeably attached to the base and includes a sealing rim extending from a surface of the lid and designed to engage the valve at the location where the valve seals to the valve mount portion. The engagement of the sealing rim with the valve forming a seal between the two components.

11 Claims, 6 Drawing Sheets

U.S. PATENT DOCUMENTS

| | | |
|---|---|---|
| 5,927,566 A | 7/1999 | Mueller |
| 6,045,004 A | 4/2000 | Elliott |
| 6,089,411 A | 7/2000 | Baudin et al. |
| 6,112,951 A | 9/2000 | Mueller |
| 6,152,324 A | 11/2000 | Baudin |
| 6,213,355 B1 | 4/2001 | Schwanenberg |
| 6,223,956 B1 | 5/2001 | Alber |
| 6,230,940 B1 | 5/2001 | Manning et al. |
| 6,257,431 B1 | 7/2001 | Baudin |
| 6,279,783 B1 | 8/2001 | Brown et al. |
| 6,290,108 B1 | 9/2001 | Gross |
| 6,293,437 B1 | 9/2001 | Socier et al. |
| H2027 H | 6/2002 | Brown et al. |
| 6,405,901 B1 | 6/2002 | Schantz et al. |
| 6,427,874 B2 | 8/2002 | Brown et al. |
| 6,446,844 B1 | 9/2002 | Gross |
| 6,494,346 B2 | 12/2002 | Gross et al. |
| 6,530,504 B2 | 3/2003 | Socier |
| 6,536,617 B2 | 3/2003 | White et al. |
| 6,575,330 B2 | 6/2003 | Rousselet |
| 6,616,016 B2 | 9/2003 | Hicks et al. |
| 6,672,487 B1 | 1/2004 | Lohrman |
| 7,152,763 B2 * | 12/2006 | Stull et al. .................. 222/212 |
| 2003/0085240 A1 * | 5/2003 | Dark .......................... 222/494 |
| 2004/0251278 A1 * | 12/2004 | Arai .......................... 222/212 |
| 2005/0006407 A1 * | 1/2005 | Lawson et al. ........ 222/153.13 |

* cited by examiner

CONTAINER CLOSURE AND METHOD OF ASSEMBLY

RELATED APPLICATION

This application is a continuation-in-part application of application Ser. No. 10/888,162, filed Jul. 8, 2004, now U.S. Pat. No. 7,152,763 which is incorporated herein by reference in its entirety.

FIELD OF THE INVENTION

The invention relates generally to containers used to dispense fluids and other substances, such as foodstuffs (for example, ketchup) or cosmetics. More particularly, the invention relates to a closure for a squeeze-type container wherein contents can be discharged from the container through a self-closing valve.

BACKGROUND OF THE INVENTION

Many different configurations of self-sealing valves for use with squeeze-type containers are known in the prior art. U.S. Pat. No. 6,230,940 (Manning et al.) and U.S. Pat. No. 6,530,504 (Socier) both disclose a self-sealing valve mechanically retained in a closure. U.S. Pat. No. 5,927,566 (Mueller) discloses a self-sealing valve bonded by a molding process to a closure. U.S. Pat. No. 5,743,443 (Hins) discloses a valve bonded to a base, the valve/base combination in turn being retained against a container neck by a fastening element. U.S. Pat. No. 6,152,324 (Baudin) discloses a valve bonded directly to a container. U.S. Pat. No. 4,728,006 (Drobish et al.) discloses several embodiments of a self-sealing valve mechanically retained by a closure against a bottle neck. In each of these inventions, the valve or the combination of the valve and the component to which it is attached for subsequent engagement with a container must be designed for a specific container configuration.

It is an object of the invention to provide a self-sealing valve and adapter assembly which is inexpensively manufactured and is readily adaptable for use with containers having a wide variety of configurations.

BRIEF DESCRIPTION OF THE INVENTION

In a first aspect, the invention is a closure for use with a container having a container neck. The closure includes a base with a top that have a skirt depending from a peripheral edge of the top. The base has a valve mount portion formed on the base top. The valve mount portion includes an attachment surface. The base is made from a first thermoplastic material. A valve made from a second thermoplastic material includes a flexible central portion with at least one valve opening. The valve also includes an outer peripheral portion that is molded onto the attachment surface of the valve mount portion. A lid is hingedly attached to the base and rotates between an open position and a closed position. The lid has an inner surface. A sealing rim is located on the lid and extends downward from the inside surface when the lid is in its closed position. The sealing rim includes a lower tip which is positioned so as to contact the outer peripheral portion of the valve. The contact between the tip and the outer peripheral portion forms a substantial seal between the sealing rim and the outer peripheral portion.

In one embodiment of the invention, the valve mount portion is an adapter formed from a first thermoplastic material and includes a housing with a passage extending through the adapter. The adapter includes a first end and a second end. At least one adapter connector is formed on the adapter at or near the first end. The valve attachment surface is formed on the adapter at or near the second end. The adapter connector is engaged with a base connector on the base.

In one configuration of the invention, the lid includes a protrusion positioned on the inner surface of the lid and located to as to be positioned adjacent to the central portion of the valve when the lid is in its closed position. The protrusion is designed to inhibit the valve from opening when the lid is in the closed position.

In one embodiment of the invention, the sealing rim is substantially cylindrical in shape and sized to locally compress the outer peripheral portion of the valve when the lid is in its closed position.

The basic aspects of the present invention may be combined in a number of forms. The preferred aspects of the various constructions may be used in conjunction with one another or used alone. The various features provide certain advantages over the prior art. These advantages will be described herein and will be understood by those skilled in the art upon reviewing the description and drawings.

BRIEF DESCRIPTION OF THE SEVERAL VIEWS OF THE DRAWINGS

For the purpose of illustrating the invention, there are shown in the drawings forms of the invention which are presently preferred; it being understood, however, that this invention is not limited to the precise arrangements and instrumentalities shown. In the drawings.

DETAILED DESCRIPTION OF THE DRAWINGS

Figure 1:
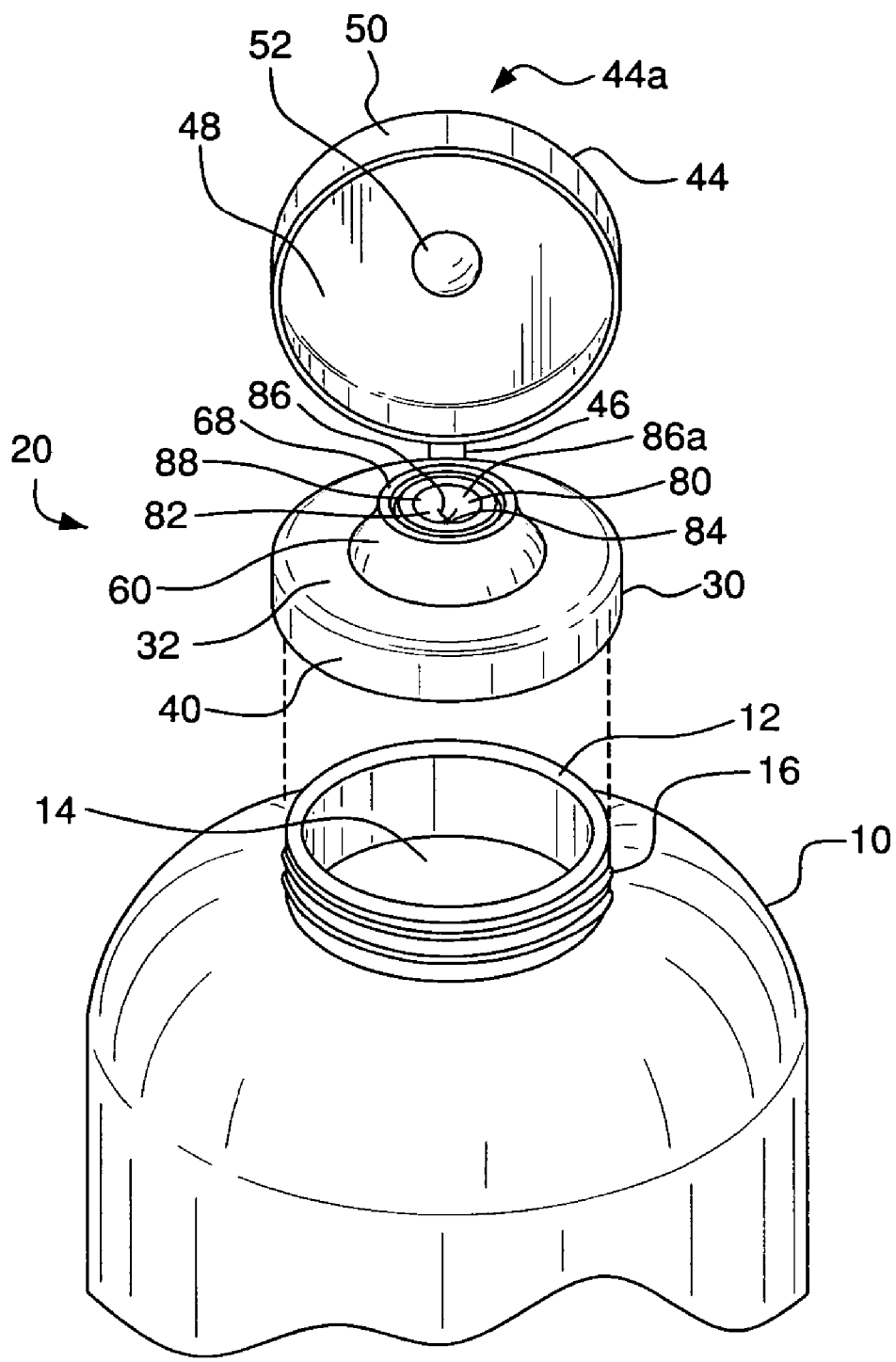
FIG. 1 is a perspective view of a first preferred embodiment of the closure of the present invention shown removed from a container and showing a lid of the closure in an open position.

As used herein, the term "multi-material molding" means any conventional molding process in which two or more materials are injected simultaneously or in sequence into a single mold during a single molding cycle. Multi-material molding is intended to include co-injection molding, bi-injection molding, two-shot molding and insert molding techniques well known to those of ordinary skill in the art of injection molding.

Referring to the drawings, and initially to FIGS. 1-3A, a closure for a container is indicated generally by the reference numeral 20. The closure 20 is adapted for use with a conventional container 10. The container 10 comprises a container neck 12, defining a container opening 14. The container neck 12 may be provided with an external helical thread 16 for threaded engagement with the closure 20. Alternatively, the container 10 and closure 20 may be connectable with inter-engaging snap elements (e.g., raised beads and recesses) (not shown). Also, the closure 20 could be permanently affixed to the container neck 12 by any number of conventional techniques including induction melting, ultrasonic melting or use of adhesive.

The container 10 is preferably squeezable with at least one flexible wall capable of being manually deformed to compress the contents therein and increase the pressure within the container to force the contents out of the container.

The closure 20 is an assembly of a base 30, an adapter 60 and a valve 80. In a first preferred embodiment, the base 30 includes a top 32 having an outer periphery. An opening 34 is formed in the top 32, the opening 34 being surrounded by a lip 36. As discussed further below, in this embodiment, the lip 36 is sized and shaped to be engaged by an adapter connector 70, and thus the lip 36 serves as a base connector 38. A base skirt 40 depends from the outer periphery, generally perpendicular to the top 32. A base helical internal thread 42 may be provided on an interior surface of the base skirt 40, allowing the base 30 to be connected to the container neck 12 by threaded engagement of the internal thread 42 with the external thread 16. While threads are shown in the figures, those skilled in the art would readily appreciate that many other conventional attachments may be used for a engaging the base with the container neck.

The base 30 further preferably includes a lid 44 hingedly attached to the base 30 by a hinge 46. The hinge permits that lid 44 to rotate or pivot between an open position 44a and a closed position 44b. The lid 44 includes a lid top 48 having a periphery, and a lid skirt 50 extending from the lid top 48. Preferably, the lid 44 includes a protrusion 52 on an interior side of the top 48 of the lid. The protrusion 52 is preferably sized, shaped and positioned to prevent a valve aperture 86 from opening when the lid 44 is in the closed position 44b.

The base 30, including the lid 44, is preferably fabricated using conventional thermoplastic materials such as polyolefins, including polypropylene, and using conventional fabrication techniques, such as injection molding, well known to those of ordinary skill in the art of bottle closures.

The adapter 60 is formed from a first thermoplastic material, preferably a polyolefin material such as polypropylene. The adapter 60 includes a shell or housing 62, which is preferably cylindrical in shape and which defines a passage 64 through the adapter. The adapter 60 has a first end 66 and a second end 68. At least one adapter connector 70 is provided proximate the first end 66. In a first preferred embodiment, the adapter connector 70 is a hook element that engages and latches with the base connector 38 to connect the adapter 60 to the base 30. The adapter 60 further includes a valve attachment surface 72. It is along this surface 72 that the valve 80 is connected to the adapter 60. As should be readily apparent in view of this disclosure, numerous variations are possible for forming the inter-engaging base and adapter connectors 38, 70, as well as the valve attachment surface 72.

The valve 80 is formed from a second thermoplastic material, preferably a thermoplastic elastomer. The valve 80 has a resiliently flexible central portion 82 provided with at least one opening 84 forming an aperture 86. The aperture 86 has a closed position 86a and an open position 86b. The resiliency of the flexible central portion 82 biases the aperture 86 into the closed position 86a. Upon application of a predetermined pressure to the central portion 82 near the aperture 86, the central portion 82 flexes from a retracted position 82a into an extended position 82b, such that the aperture 86 moves to the open position 86b. When the pressure applied to the central portion 82 decreases below the predetermined level, the resilient nature of the aperture 86 biases it back to the closed position 86a. Preferably, at least the central portion 82 of the valve 80 has a substantially uniform wall thickness.

The valve 80 includes an outer peripheral portion 88. The valve outer peripheral portion 88 is molded to the adapter 60 at the attachment surface 72 thereby bonding the valve 80 to the adapter 60 to form an adapter and valve assembly. A pleated portion 90, forming a bellows-like fold, may be provided to allow increased flexure of the central portion 82. The pleated portion 90 acts to bias the central portion 82 into the retracted position 82a.

Figure 2:
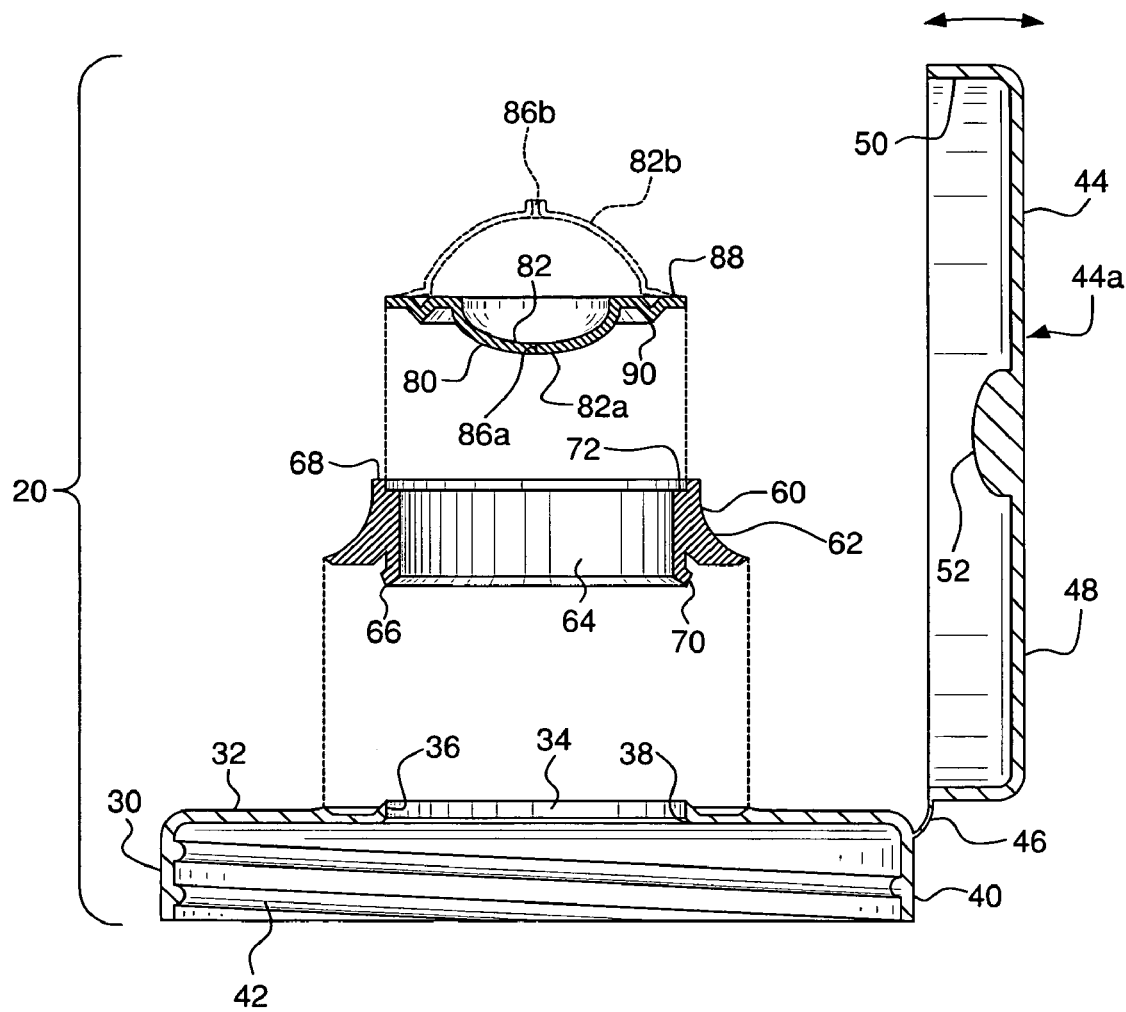
FIG. 2 is an exploded cross-sectional view of the closure of FIG. 1.
Figure 3:
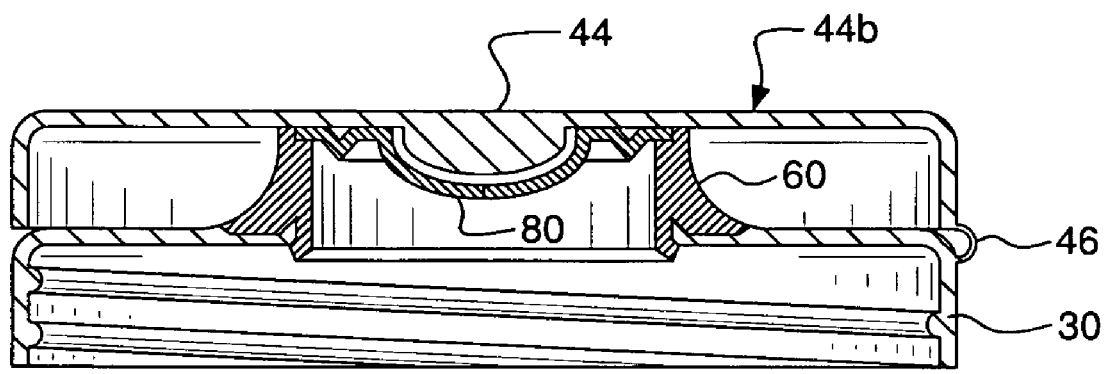
FIG. 3 is cross-sectional view of the closure of FIGS. 1 and 2, showing the lid in a closed position.
Figure 3A:
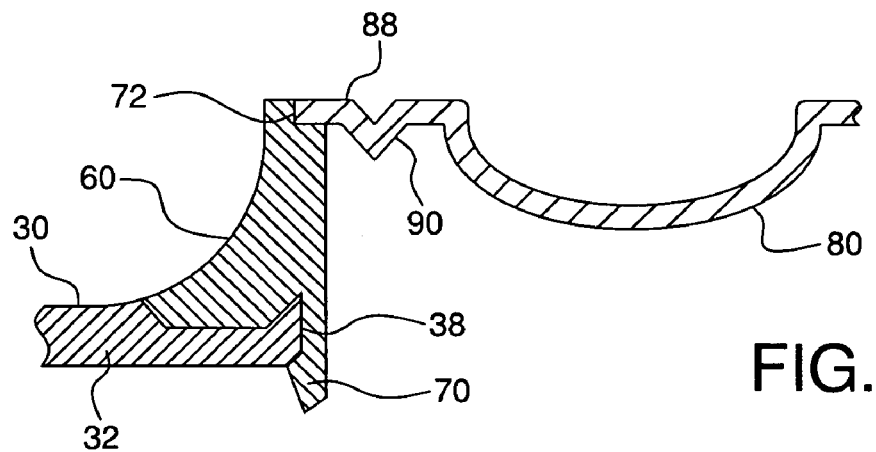
FIG. 3A is an enlarged view of a portion of the closure of FIGS. 1-3, showing connections between first embodiments of a valve, an adapter and a base.

FIGS. 1-3 illustrate a presently preferred embodiment wherein the base opening 34 is formed in the top 32. Alternatively, the base opening 34 (and the base connector 38) could be positioned elsewhere on the base 30, for example on a side portion of the base 30.

In one preferred embodiment, the adapter and valve assembly of the closure 20 are formed by a multi-material molding process. In summary, this process entails sequentially injecting first and second thermoplastic materials into a single mold such that the adapter 60 is formed from the first thermoplastic material, the valve 80 is formed from the second thermoplastic material and a physical bond between the adapter 60 and valve 80 is formed during the molding process, eliminating the need for any subsequent assembly using adhesive or other types of fasteners to join the adapter 60 to the valve 80. It has been found to be advantageous to form valve 80 using a so-called "center-gated" molding technique, whereby the valve 80 material is injected into the mold through a port which is centrally and symmetrically positioned relative to the valve body. Using this center-gated approach, it is found that non-symmetric residual stresses that might otherwise occur are eliminated or minimized, thus enhancing performance of the valve 80.

After the adapter and valve assembly are integrally formed, the assembly is connected to the base to form the closure 20. As discussed above, the connection is made by engagement of the adapter connector 70 with the base connector 38. As discussed below, numerous embodiments of the adapter connector and base connector are possible. Preferably the connection is one that is performed in a manner that prevents subsequent disconnection. Also, it is preferred that the connection be a snap connection wherein the assembly is snapped downward on, onto or into engagement with the base, thus forming the complete closure.

After the closure is formed, it is connected to the container neck, for example, by screwing the closure 20 onto the container neck 12 (for containers 10 having a conventional threaded design), snapping the closure 20 onto the container neck 12 (for containers having a conventional snap-on design), or by permanently affixing the closure 20 to the container neck 12.

Upon assembly of the closure 20 to the container 10, the adapter 60 does not interface directly with the container neck 12. That is, the valve and adapter assembly, when incorporated into the closure 20 and installed on the container 10, is separated from the container 10 by the base 30.

In this manner, as the valve and adapter assembly does not directly connect or otherwise directly interface with the container, the design of the valve and adapter assembly is generally independent of the design of the container, and a single valve and adapter assembly design may be adapted for use with different types of containers.

In use, the lid 44 is placed in the open position 44a and the container 10 is squeezed, pressurizing and forcing contents of the container 10 against an interior side of the valve central portion 82. When the pressure within the container exceeds the predetermined level necessary to open the aperture 86, contents of the container 10 are dispensed. When the pressure within the container 10 falls below the predetermined level, the aperture 86 moves back to the closed position 86a. After use, the lid 44 is rotated back into the closed position 44b. As discussed above, the lid preferably includes a lid protrusion 52 formed on the lid that moves with the remainder of the lid 44, into a position adjacent to the aperture 86. The lid protrusion 52 blocks the aperture 86 so as to prevent or inhibit the valve central portion 82 from flexing and/or rotating open. Thus, the lid protrusion 52 operates to prevent discharge of the container contents should the container 10 be squeezed when the lid 44 is in the closed position 44b.

From this disclosure, those skilled in the art will recognize that it is possible to omit the base 30 from the closure 20, and design a container 10 having a neck 12 provided with a connector corresponding to the base connector 38, adapted to engage the adapter connector 70, thus allowing the valve and adapter assembly to be mounted directly to the container 10.

With reference now to FIGS. 4-7, second through fifth embodiments of the base 30, adapter 60 and valve 80 illustrate that connections between the base 30 and adapter 60 and between the adapter 60 and valve 80 can be made in various ways. In FIGS. 4-7, elements of the second through fifth embodiments corresponding to like elements of the first embodiment are numbered in increments of 100, 200, 300, 400 and 500, respectively, above the reference number of the corresponding first embodiment element.

Figure 4:
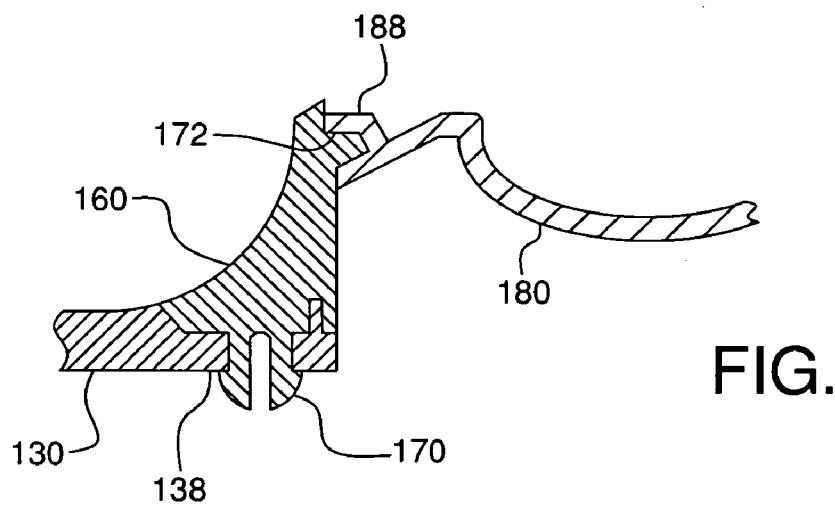
FIG. 4 is a view similar to FIG. 3A, showing connections between second embodiments of the valve, adapter and base.

A second embodiment base 130, adapter 160 and valve 180 are illustrated in FIG. 4. The adapter connector 170 is in the form of a pin, having a hook-like portion adapted to engage the base connector 138. The base connector 138 is in the form of an opening in the base 130, and is sized and shaped to receive and engage the adapter connector 170. Furthermore, the peripheral portion 188 of the valve 180 is bifurcated and engages the valve attachment surface 172 along multiple planes.

Figure 5:
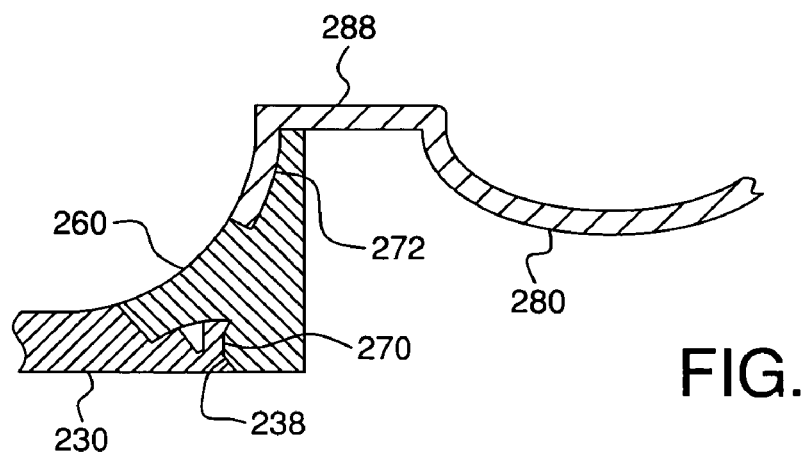
FIG. 5 is a view similar to FIG. 3A, showing connections between third embodiments of the valve, adapter and base.

A third embodiment base 230, adapter 260 and valve 280 are illustrated in FIG. 5. The adapter connector 270 is in the form of a raised bead, adapted to engage the base connector 238, in the form of a recess in the base 230, sized and shaped to receive and engage the adapter connector 270. Furthermore, the peripheral portion 288 of the valve 280 engages the valve attachment surface 272 along an exterior portion of the adapter 260.

Figure 6:
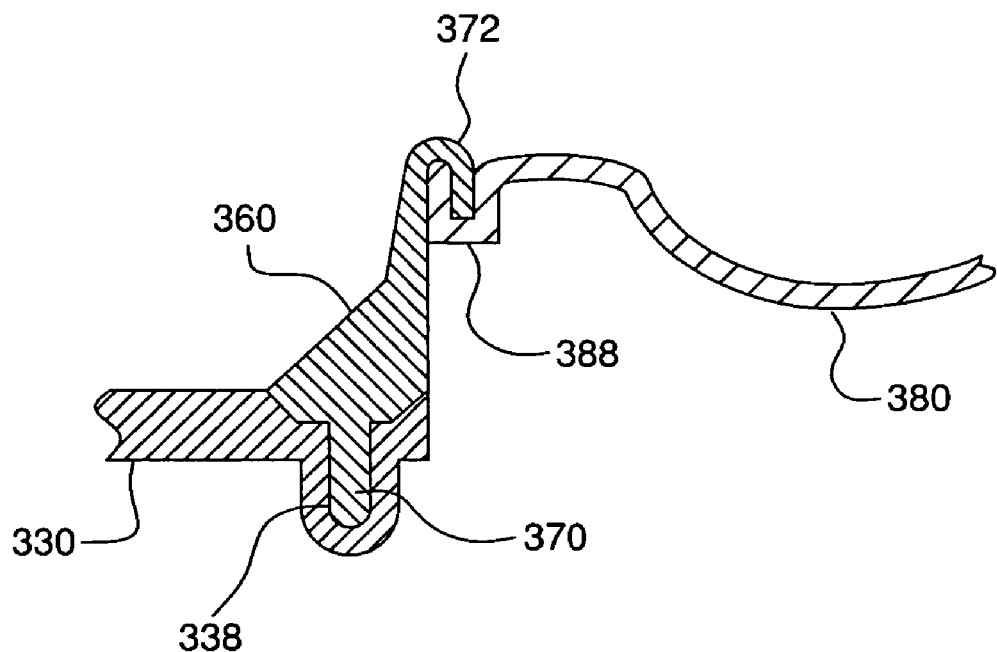
FIG. 6 is a view similar to FIG. 3A, showing connections between fourth embodiments of the valve, adapter and base.

A fourth embodiment base 330, adapter 360 and valve 380 are illustrated in FIG. 6. The adapter connector 370 is in the form of a shaft having an outer extent with a first dimension, adapted to engage the base connector 338, in the form of a recess in the base 330, the recess having an inner bore with a second dimension such that an interference fit occurs when the adapter connector 370 is inserted into the base connector 338. Furthermore, the peripheral portion 388 of the valve 380 forms a channel-like structure which engages the valve attachment surface 372 of the adapter 360 in an interlocking fashion.

Figure 7:
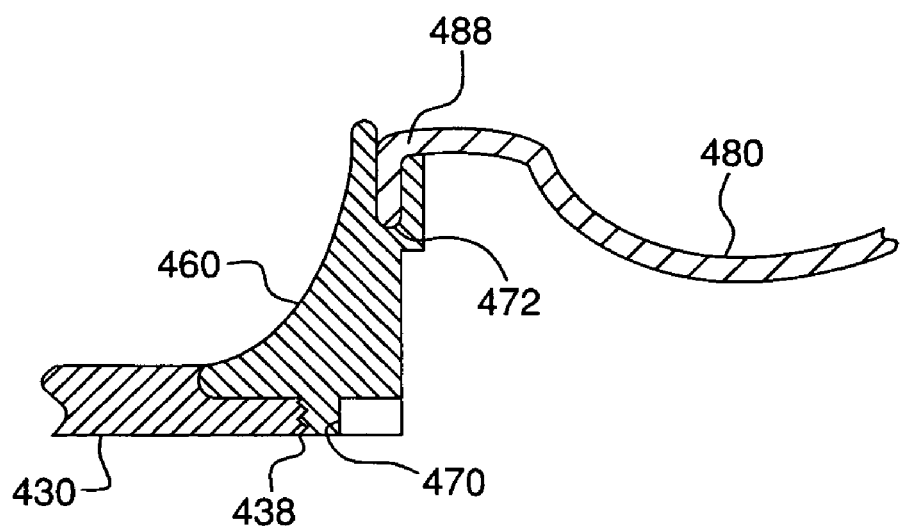
FIG. 7 is a view similar to FIG. 3A, showing connections between fifth embodiments of the valve, adapter and base.

A fifth embodiment base 430, adapter 460 and valve 480 are illustrated in FIG. 7. The adapter connector 470 has a plurality of corrugated or tooth-like structures which are adapted to engage similar corrugated structures on the base connector 438. Furthermore, the peripheral portion 488 of the valve 480 is adapted to be received within a slot forming the valve attachment surface 472 of the adapter 460.

Figure 8:
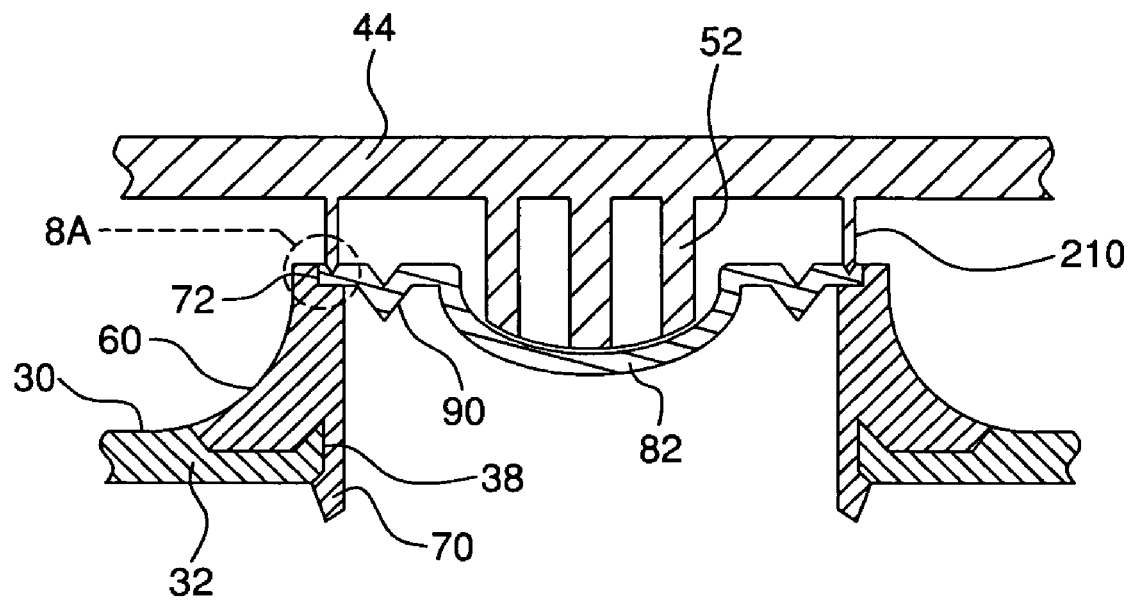
FIG. 8 is an enlarged cross-sectional view of a portion of the closure of FIG. 1 including a novel cap for assisting in sealing the valve.

Referring now to FIG. 8, a cross-sectional view of a portion of the bottle closure is shown with a novel lid design. As discussed above, the lid 44 preferably includes a protrusion 52 which is designed to lie adjacent to or against the valve in the closed position so as to prevent inadvertent opening or flexure of the valve central portion 82. In the embodiment illustrated in FIG. 8, the lid 44 includes not only the protrusion 52, which in this embodiment is preferably one or more spaced apart ribs 200, but also a sealing rim 210 that extends from the lower surface of the lid 44 and is positioned to engage the valve outer peripheral portion 88 at the point where it mounted to the attachment surface 72 of the adapter 60.

Figure 8A:
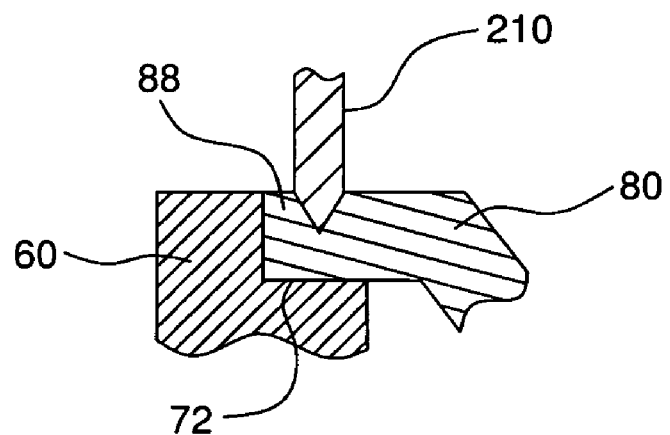
FIG. 8A is an enlarged detail of a portion of the closure of FIG. 8.

The sealing rim is designed to provide a physical engagement or seal between the lid 44 and the valve, thus preventing material from passing to or from the valve are inside the lid. More particularly, as shown in FIGS. 8 and 8A, the sealing rim 210 extends down from the lower or inside surface of the lid 44 and has a length of sufficient dimension to contact, and more preferably, press into the sealing outer peripheral portion 88 of the valve. As shown in FIG. 8A, the sealing rim 210 locally compresses the elastic valve material, thus creating a tight seal. The sealing rim 210 may include a tip end designed to facilitate a tight seal, such as a pointed tip as shown.

The sealing rim 210 may be completely cylindrical so as to completely seal the outer peripheral portion 88. Alternately, the sealing rim 210 my constitute a series of spaced apart rim portions to contact the outer peripheral portion at spaced apart areas. The rim portion may be formed as a substantially rigid member as shown in the figures, or may be designed to flex to some degree to accommodate manufacturing tolerances.

While the figures illustrate a sealing rim 210 in combination with the protrusion 52, it should be readily apparent that the lid need not include both. For example, since the sealing rim 210 is designed to provide sealing around the valve, it may be desirable to not include a protrusion in the lid.

The present invention may be embodied in other specific forms without departing from the spirit or essential attributes thereof and, accordingly, reference should be made to the appended claims, rather than to the foregoing specification, as indicating the scope of the invention.

Although distinct embodiments have been described, those skilled in the art will understand how features from different embodiments may be combined.

Furthermore, while the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A closure for a container having a container neck, the closure comprising:

a base having a top with a periphery from which a skirt depends, the base having a valve mount portion formed on the top of the base, the valve mount portion including an attachment surface, the base being made from a first thermoplastic material;

a valve made from a second thermoplastic material, the valve having a flexible central portion with at least one valve opening and an outer peripheral portion molded onto the attachment surface, the flexible central portion movable between opened and closed valve positions in which the valve opening is respectively opened and closed; and a lid hingedly attached to the base for rotation between an open lid position and a closed lid position, the lid having an inner surface and a protrusion positioned on the inside surface of the lid so as to be located adjacent to the central portion of the valve when the lid is in the closed lid position to inhibit movement of the valve to the opened valve position, the lid including a sealing rim having a lower tip and formed on the lid to extend downwardly from the inner surface when the lid is in its closed position, the sealing rim spaced outwardly from the protrusion for contact between the lower tip and the outer peripheral portion of the valve, the contact between the lower tip and the outer peripheral portion forming a substantial seal therebetween.

2. The closure of claim 1, wherein the valve mount portion is an adapter formed from the first thermoplastic material and defining a housing with a passage extending through the adapter, the adapter including a first end and a second end, at least one adapter connector on the adapter at or near the first end, and wherein the valve attachment surface is formed on the adapter at or near the second end, and wherein the adapter connector is engaged with a base connector on the base.

3. The closure of claim 2, wherein the adapter connector includes a hook portion which engages the base connector.

4. The closure of claim 2, wherein the adapter connector is snapped into engagement with the base connector.

5. The closure of claim 1, the container neck having an external thread, the base skirt further including an internal thread, wherein the closure connects to the container neck by engagement of the external and internal threads.

6. The closure of claim 1, wherein the closure is permanently affixed to the container neck.

7. The closure of claim 1, wherein the first thermoplastic material is a polyolefin and the second thermoplastic material is a thermoplastic elastomer.

8. The closure of claim 7, wherein the polyolefin is polypropylene.

9. The closure of claim 1, wherein the sealing rim is substantially cylindrical in shape and sized to locally compress the outer peripheral portion of the valve when the lid is in its closed position.

10. A closure assembly for a container comprising:

a base adapted for attachment to a neck of a container;

a valve mount member having opposite first and second ends and defining a passage extending through the valve mount member between the first and second ends, the valve mount member secured within an opening of the base;

a valve located adjacent the second end of the valve mount member such that the valve covers the passage of the valve mount member, the valve including a flexible inner portion defining a valve opening and an outer peripheral portion attached to the valve mount member, the flexible inner portion movable between opened and closed valve positions in which the valve opening is respectively opened and closed;

a lid hingedly attached to the base for rotation between an open lid position and a closed lid position;

a valve-stopping protrusion located on an inner surface of the lid adjacent the flexible inner portion of the valve when the lid is in the closed lid position to inhibit movement of the valve to the opened valve position; and a seal rim located on the inner surface of the lid and spaced outwardly from the valve-stopping protrusion for contact between the seal rim and the outer peripheral portion of the valve to form a substantial seal therebetween.

11. The closure assembly of claim 10, wherein the valve defines at least one pleat to facilitate movement of the flexible inner portion between the closed and opened valve positions.

* * * * *